Patented Aug. 9, 1938

2,126,430

UNITED STATES PATENT OFFICE 2,126,430

METHOD OF TREATING SHIPS' TANKS AND OTHER LARGE CONTAINERS TO PROTECT THEIR INTERIOR SURFACES AGAINST CORROSION

Theodor Broch Unger, Fredriksstad, Norway

No Drawing. Application February 8, 1938, Serial No. 189,454. In Norway December 21, 1934

12 Claims. (Cl. 91—68)

This invention relates to the treatment of ships' tanks, ships' hulls, oil tanks on board ships and on land and other large containers of iron or steel to protect the interior surface of same against corrosion.

The invention is a continuation in part of my co-pending application Serial No. 19,117, filed on the 30th of April, 1935, for a method of providing iron and steel structures with a protective coating.

The protection of the interior wall surfaces of ships' tanks and other large containers is a problem of great importance, involving difficulties of a special character. This is more particularly the case when the containers are to be used for the transportation of fuel oils, such as petroleum, benzine and the like, or of edible oils, such as for example whale oil. In such instances the conventional anticorrosion paints having oils as a substantial constituent, cannot be used. For this particular purpose coating compositions containing waterglass as a vehicle have been used, but usually the protective coatings obtained by such means are not capable of resisting the action of water and tanks treated with such materials are therefore not well suited for alternately carrying oils and water (as a ballast).

The present invention has for its object a method of treating the interior surfaces of large iron and steel containers by means of which an efficient protection is attained by simple means and without the drawbacks connected with the methods hitherto employed.

An important feature of the invention consists therein that the container in question is filled with a substantially neutral, nonoxidizing aqueous liquid, containing a small amount of zinc or other heavy metal above iron in the electromotive series of the metals in the form of a salt of a strong mineral acid as well as a salt of a weak organic acid, capable of forming anion complexes with iron, the said liquid being left standing in the container for some time at atmospheric temperature.

The preferred salts capable for forming anion complexes with iron contained in the aqueous solution employed are alkaline metal salts of tartaric acid which is a polyvalent organic hydroxy acid. The salt of a heavy metal above iron in the electromotive series may for example be a chloride or sulphate of zinc or cadmium.

The said heavy metal salt and the said salt of a weak acid capable of forming complex iron compounds should preferably be employed in substantially equimolecular proportions.

It has been found that by a treatment as above outlined it is possible to provide the iron surfaces with a protective coating, which without any special after-treatment (such as drying by heat) is capable of offering effective resistance for a long time even under conditions where the coating is subjected to incessant mechanical strains produced by liquids in violent motion. The formation and maintenance of sufficiently protective coatings on iron and steel structures by means of the present method are practically possible, owing to the fact that the formation can take place without previously removing rust from the surfaces by chemical or mechanical means, and without raising the temperature of the iron or steel structure above that of the atmosphere.

Protective coatings produced according to the invention are capable of being readily repaired after having been ruptured by mechanical or chemical influences. This can be done by simply subjecting the surface to a repair treatment with a solution of the same character as that employed to produce the coating, and without first removing the rust from the wound in the coating.

The protective coating produced by the treatment according to the invention has been found to consist of a layer of zinc (or other heavy metal above iron, but not above magnesium in the electromotive series of the metals) adhering to the iron surface and on top of this layer (of zinc or the like) a coating or crust of compounds of the coating metal (comprising basic salts of the coating metal or mixtures of hydroxide and salts of the coating metal with the weak acid employed as a constituent of the solution). In the case of a solution of for example zinc chloride and alkali metal tartrate, the crust has been found to contain zinc oxide (in a hydrated condition) and zinc tartrate. When rusty iron surfaces are subjected to the action of solutions of the specified character, the crust has been found to contain besides compounds of the coating metal also bivalent iron compounds which have been formed by the reduction of trivalent iron compounds constituting the rust. The compounds constituting the crust efficiently protect the underlying layer of coating metal (zinc or the like) and function as a magazine of substances from which the deposition of zinc (or other coating metal) will continue as long as moisture (water) is present in the crust. To retain this power of functioning as a protective coating as well as a magazine for further deposition of coating metal the coating should not be subjected to such high temperatures as to bring about decomposition or complete dehydration of the same. It is of importance that the colloidal character of the crust is retained. The coating should therefore always be left on the iron surface in a moist condition.

The thickness of the crust will vary with the time during which the liquid is maintained in contact with the iron or steel surface and also with the nature and percentage of reacting salts in the solution.

EXAMPLES

I

A ship-tank made of iron and which had been in use for carrying fuel oil, was cleaned by means of steam and water and thereupon filled with sea water. Pulverized or dissolved potassium tartrate and an equivalent quantity of zinc chloride was then introduced into the water in such a quantity that the percentage of zinc became about 0.1 per cent.

The solution was left standing in the tank. Circulation of the liquid in the tank was provided for by slight local heating (by means of steam introduced at the bottom of the tank). This introduction of steam did not bring about any substantial rise of temperature in the liquid as a whole (not above 30° C.). After about 5 days a good protective coating had been obtained. The coating consisted of a layer of metallic zinc deposited on the iron surface, and on top of this metallic coating a layer of zinc compounds.

II

A ship-tank (made of steel) which had been in use for carrying benzine containing some free acid, was cleaned by water and steam and thereupon filled with sea water as a ballast. In the water (which had a temperature of about 10° C.) was then dissolved a small quantity of potassium tartrate as well as some zinc chloride. On standing (without heating), the solution caused the production of a coating of zinc and zinc compounds on the clean iron surface. In the layers of rust originally present there had been formed a dense coating of basic salts, reinforced by bivalent iron compounds formed by reduction of the trivalent iron compounds constituting the original layer of rust.

III

A water ballast tank (made of steel) of about 100 tons' capacity had on a previous stage been provided with a protective coating of the type obtainable according to the present invention. This coating, however, after a long time of use of the tank had become somewhat "worn". This coating was repaired by means of introducing into the tank filled with water (having a temperature of about 20 C.) about 30 kg. of zinc chloride and about 60 kg. of potassium tartrate (or 70 kg. of sodium tartrate). This quantity of added substances is sufficient to produce a slight difference of potential, with the consequence that zinc will be driven out of the solution and precipitated as a coating of metallic zinc and zinc compounds on the iron so that "wounds" in the original coating are gradually healed.

IV

Potassium tartrate and zinc chloride were dissolved in sea water (having a temperature of about 15 C.) in quantities corresponding to 20 g. of potassium tartrate and 10 g. of zinc chloride to the liter. The percentage of NaCl in the solution was about 4 per cent and of $MgCl_2$ about 0.8 per cent. An iron container was filled with this solution. After two hours' standing without heating, the container was emptied. By the action of the solution, the walls of the container had been coated with a coherent strongly adhering coating of metallic zinc and zinc compounds.

V

The method described in Example IV was employed, but the solution used contained only 0.03 gramme of potassium tartrate and 0.015 gramme of zinc chloride to the liter. After about 5 hours, there had been formed a coherently coating and strongly adhering layer of zinc compounds on the walls of the container.

VI

An iron tank of 1000 cubic meters' capacity, which had not previously been provided with a protective coating, was brushed free from loosely adhering rust. The tank was filled with sea water, to which had been added 30 kg. of zinc chloride and 70 kg. of sodium tartrate. This total quantity corresponds to 30 g. of zinc to the square meter surface, the total surface being 500 square meters. The zinc concentration, however, is only 0.015 g. to the liter corresponding to 15 g. to each cubic meter.

When the tank is left standing filled with sea water, containing this quantity of added zinc chloride and sodium tartrate, the iron surface does not rust. After about two to three weeks (at temperatures below 35° C.) an adhering coherent coating of zinc and (basic) metal salts has been formed. It is thus possible to prevent the formation of rust, even before any visible coating has been produced, in that the presence of the zinc salts and tartrate even in the mentioned small quantities will produce a difference of potential and a direction of current which gradually will cause formation of a protective coating of the specified character, although it will take a long time to produce a coating of appreciable thickness.

VII

A benzine tank (made of iron) on board of a tank lighter (the capacity of the tank being 30 cubic meters) was treated in the same manner as according to Example VI. When the tank had been filled with sea water, 60 g. of zinc chloride and 120 g. of potassium tartrate to the cubic meter were added. The total surface area being 60 square meters, the proportion was 15 g. of zinc to each square meter. Nevertheless, after three weeks' standing (at temperatures below 35 C.) a zinc coating had been formed and on top of this coating, a crust of zinc compounds and bivalent oxygen compounds of iron.

In the above examples, the zinc salts employed may be replaced by equimolecular amounts of sulphates or chlorides of cadmium or other heavy metal above iron in the electromotive series of the metals.

It has been found in the experiments made that the best results are obtained, when the treated iron or steel surfaces are rusty. It has also been found that iron with skin due to rolling can only with difficulty be provided with quite stable coating according to the invention, because the coatings were liable to be attacked and destroyed by sea water and acidic liquids (such as for example benzine containing traces of acid). Experiments made have also shown that pickled surfaces did not give results as good as rusty surfaces. By the treatment of rusty surfaces, it has been found that the coating metal wandered through the layer of rust and became deposited on the iron as a metallic coating. In addition a layer (crust) of reduced rust and one or more metal salts was formed.

It has been found to be of importance to make use of solutions containing strong electrolytes (such as alkaline metal chlorides or sulphates) in addition to the active constituents above specified. It is therefore of particular advantage to make use of sea water to prepare the solution. If only fresh water is available, the electrolytic character of the solution may be improved by the addition of some suitable electrolyte, such as for example common salt.

As above set forth, a coating produced by means of a solution of zinc salt and alkaline metal tartrate on a rusty iron surface, contains trivalent iron compounds. These latter compounds embedded in amorphous colloidal zinc compounds greatly increase the life-time of the innermost layer of zinc and the ultimate protective power of the coating as a whole.

As will be understood, the formation of the coating according to the invention is brought about without the aid of electric current from outside sources and is considered to be due to the decrease in the iron ion concentration by the formation of complex iron salts, in which the iron is not present as free iron ions.

In most of the above examples a chloride of the coating metal has been made use of to prepare the solution employed. Other compounds (such as for example sulphates) of the coating metal may, however, be employed instead of the chloride.

Instead of zinc salts the employed solutions may contain one or more of the other heavy metals above iron, such as the salts of cadmium, chromium or manganese alone or in conjunction with one another. In the experiments hitherto made, however, the best results have been obtained by the use of zinc salts alone or in conjunction with salts of one or more of the other metals referred to.

I claim:—

1. Method of treating the interior wall surfaces of ships' tanks and other large-sized containers of iron and steel to protect same against corrosion, in which the containers are for a considerable period of time and at atmospheric temperatures kept filled with a substantially neutral non-oxidizing aqueous liquid, prepared by adding to water small amounts of a heavy metal above iron but not above magnesium in the electromotive series of the metals in the form of a water-soluble salt of a strong mineral acid as well as an alkali metal tartrate, the coating produced on the iron surfaces by the action of this liquid being left on the surface in a moist condition.

2. Method according to claim 1, in which the heavy metal employed is zinc, whereby a zinc-containing coating is formed on the said surfaces.

3. Process according to claim 1, in which the solution employed also contains an alkali metal chloride.

4. Method according to claim 1, in which the solution contains the salt of the heavy metal in a total quantity of less than one per cent.

5. Method of protecting the interior wall surfaces of water ballast tanks against corrosion, in which the tanks are kept filled at atmospheric temperatures with sea water, to which have been added a small amount of a salt of a heavy metal above iron but not above magnesium in the electromotive series with a strong mineral acid, as well as a soluble tartrate in an amount substantially equivalent to that of the heavy metal salt, whereby a coating containing the said heavy metal is formed on the said surfaces.

6. Method according to claim 1, in which the solution is left standing in the container for several days.

7. Process according to claim 1, in which the solution is introduced into a container having rusty surfaces, the solution being left standing in the container until a substantial part of the trivalent iron compounds of the rust has been converted into bivalent compounds.

8. A method for preventing the formation of rust on the surface of large iron and steel structures, comprising maintaining the said surface in contact at ordinary temperature with a substantially neutral, non-oxidizing aqueous solution containing a small quantity of a salt of a metal above iron, but not above magnesium in the electromotive series of the metals and also containing an alkali metal tartrate, until a protective coating covers said surface.

9. A method for preventing the formation of rust on the surface of large iron and steel structures, comprising applying to the said surface at ordinary temperature a paste containing a substantially neutral, non-oxidizing aqueous solution containing a small quantity of a salt of a metal above iron, but not above magnesium in the electromotive series of the metals and also containing an alkali metal salt of tartaric acid.

10. A method for preventing the formation of rust on the surface of large iron and steel structures, comprising maintaining the said surface in contact for a substantial period of time at ordinary temperature with a substantially neutral, non-oxidizing aqueous solution containing a small quantity of a zinc salt and of an alkali metal tartrate, whereby a protective zinc-containing coating is formed on said surface.

11. A method for preventing the formation of rust on the surface of large iron and steel structures, comprising maintaining the said surface in contact for a period of several hours and in absence of added heat with a substantially neutral, non-oxidizing aqueous solution containing a small quantity of a water-soluble zinc salt, an alkali metal salt of tartaric acid, and glycerin, whereby a protective zinc-containing coating is formed on said surface.

12. A method for preventing the formation of rust on the surface of large iron and steel structures, comprising maintaining the said surface in contact at ordinary temperature with a substantially neutral aqueous solution containing between about 0.005 and 5 per cent of a water-soluble zinc salt and between about 0.010 and 10 per cent of an alkali metal salt of tartaric acid, whereby a protective zinc-containing coating is formed on said surface.

THEODOR BROCH UNGER.